United States Patent
Walker et al.

(10) Patent No.: US 7,934,775 B2
(45) Date of Patent: May 3, 2011

(54) RESTRAINT IN VEST

(75) Inventors: Andrew Walker, Deerfield Beach, FL (US); Marianne Kump, Pompano Beach, FL (US); Ron Grilliot, Davie, FL (US)

(73) Assignee: BAE Systems Safety Products, Inc., Pompano Beach, FL (US)

( * ) Notice: Subject to any disclaimer, the term of this patent is extended or adjusted under 35 U.S.C. 154(b) by 0 days.

(21) Appl. No.: 12/694,602

(22) Filed: Jan. 27, 2010

(65) Prior Publication Data

US 2011/0057500 A1 Mar. 10, 2011

Related U.S. Application Data

(60) Provisional application No. 61/239,948, filed on Sep. 4, 2009.

(51) Int. Cl.
*B60R 22/00* (2006.01)
*A62B 35/00* (2006.01)

(52) U.S. Cl. ........................................................ 297/465

(58) Field of Classification Search ................... 297/465, 297/464, 468, 474; 2/102
See application file for complete search history.

(56) References Cited

U.S. PATENT DOCUMENTS

| | | | |
|---|---|---|---|
| 4,042,194 A | 8/1977 | Frost et al. | |
| 4,437,628 A * | 3/1984 | Schwartz | 244/122 AG |
| 4,451,932 A | 6/1984 | Wagemann et al. | |
| 4,488,544 A | 12/1984 | Triunfol | |
| 4,515,155 A | 5/1985 | Wagemann | |
| 4,550,724 A | 11/1985 | Berrehail | |
| 4,571,000 A * | 2/1986 | Holder | 128/874 |
| 4,632,425 A | 12/1986 | Barratt | |
| 4,744,354 A | 5/1988 | Triunfol | |
| 4,832,053 A | 5/1989 | McCarthy | |
| 4,947,869 A | 8/1990 | Grant | |
| 5,031,960 A | 7/1991 | Day | |
| 5,072,897 A | 12/1991 | Aronne | |
| 5,544,363 A | 8/1996 | McCue et al. | |
| 5,562,326 A * | 10/1996 | Stroud | 297/465 |
| 6,254,184 B1 | 7/2001 | Kontos | |
| 6,637,377 B2 | 10/2003 | Lobanoff et al. | |
| 6,827,044 B2 | 12/2004 | Lobanoff et al. | |
| 7,093,413 B1 * | 8/2006 | Hughes | 54/44.1 |
| 7,143,446 B1 | 12/2006 | Gionfriddo | |
| 7,266,850 B1 | 9/2007 | Strum et al. | |
| 2003/0001378 A1 | 1/2003 | Kim et al. | |
| 2005/0179244 A1 * | 8/2005 | Schroth | 280/808 |

* cited by examiner

FOREIGN PATENT DOCUMENTS

WO WO/93/05986 4/1993

OTHER PUBLICATIONS

Installation Instructions, kit, for HMMWV Gunner Restraint (Single Lower with Swivel), Mar. 16, 2006.
Operating Instructions, kit, for HMMWV Gunner Restraint (Single Lower), Dec. 12, 2005.
PCT International Application No. PCT/US2010/022196, International Search Report and Written Opinion dated Apr. 14, 2010.

*Primary Examiner* — Milton Nelson, Jr.
(74) *Attorney, Agent, or Firm* — Kane Kessler, P.C.; Paul E. Szabo (57) ABSTRACT

An apparatus for helping to protect an occupant of a vehicle includes a vest and a restraint incorporated into the vest. The vest includes a front panel, a back panel, and left and right shoulder portions extending between the front panel and the back panel. The vest has an inner face and an outer face. The restraint includes a front latch fixed to the vest front panel and a back latch fixed to the vest back panel. The restraint includes webbing portions extending in a force-transmitting relationship between the front latch and the back latch, within the front panel and the shoulder portions and the back panel of the vest, so as to extend at least partially around the torso of a occupant wearing the vest. The front panel of the vest includes a front armor pocket and the back panel of the vest includes a back armor pocket, for receiving and supporting panels of body armor.

13 Claims, 6 Drawing Sheets

RESTRAINT IN VEST

RELATED APPLICATION

This application claims the benefit of U.S. Provisional Application No. 61/239,948, filed Sep. 4, 2009, titled Restraint In Vest. The entire disclosure of said provisional application is incorporated by reference.

BACKGROUND OF THE INVENTION

This invention relates to an occupant protection system. In particular, this invention relates to a restraint system, such as a safety belt system, that is incorporated into a garment, such as a vest, that is worn by an occupant of a vehicle. The system components in the vest connect with system components in the vehicle to restrain the occupant in the vehicle.

DESCRIPTION OF THE PRIOR ART

A prior art Gunner Restraint System ("GRS") includes a harness that is worn over an occupant's clothing or uniform. The GRS includes only one point of attachment to a land vehicle or aircraft, specifically, a single buckle in the back of the harness that connects with a single latch that is anchored to the vehicle via a webbing retractor. This system is operative to restrain the occupant from vertical ejection by locking the retractor upon sensing of sufficient inclination or acceleration.

A prior art 910 system is similar to the GRS but adds two hip-mounted latches to the external occupant protection system (restraint) that is worn over the occupant's clothing or uniform. With these latches, the occupant can alternatively buckle into a seat to be restrained while in the seated position.

DESCRIPTION OF THE INVENTION

Figure 1:
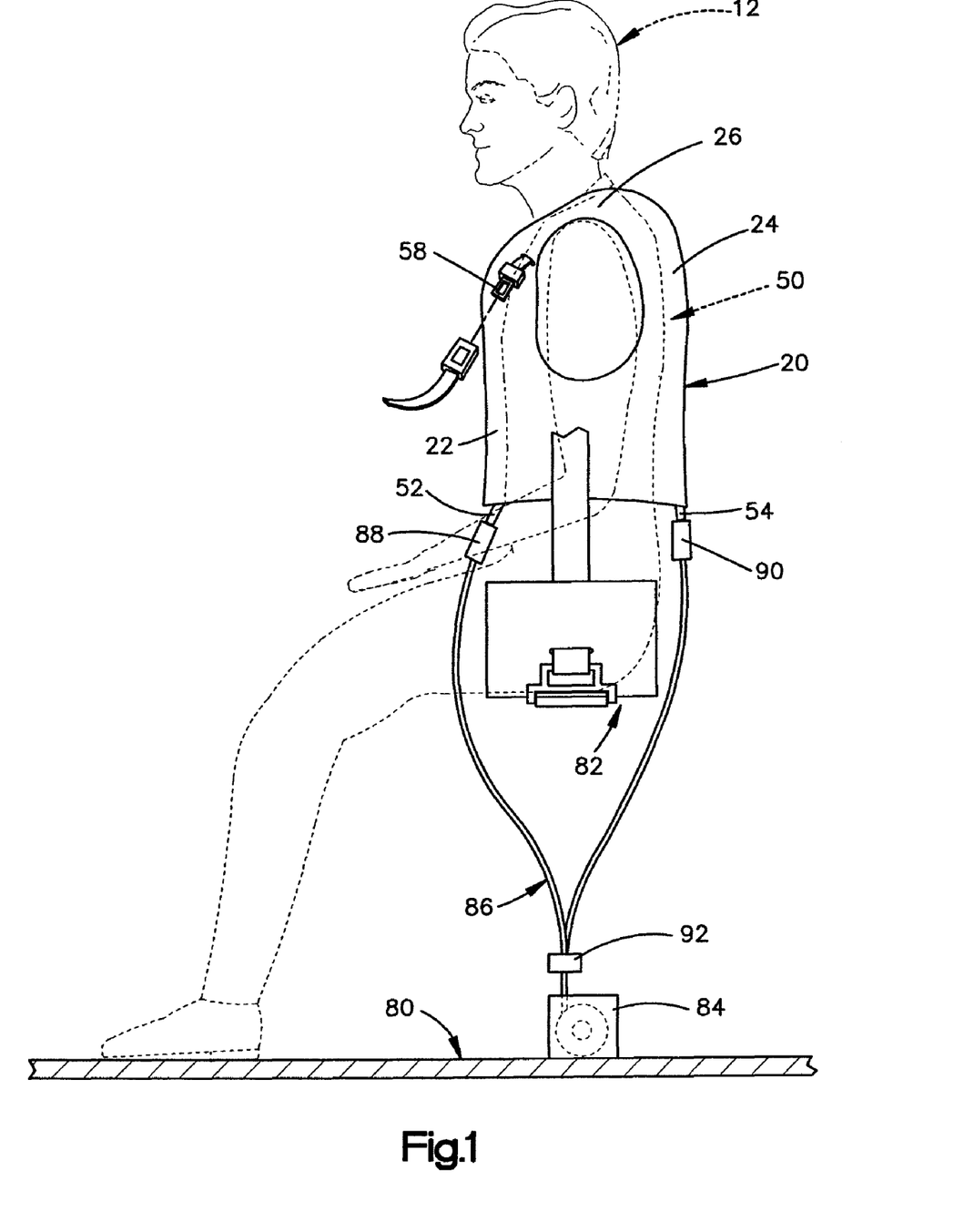
FIG. 1 is a schematic illustration showing an occupant in a seat and wearing a vest with restraint that is a portion of an occupant protection system in accordance with one embodiment of the invention.

This invention relates to an occupant protection system. In particular, this invention relates to a safety belt system or restraint system that is at least partially incorporated into an upper garment, such as a vest, that is worn by an occupant of a vehicle. As representative of the invention, FIG. 1 illustrates an occupant protection system or restraint system 10 that is a first embodiment of the invention.

The system 10 includes a vest 20; a restraint 50 incorporated in the vest; and components fixed to the vehicle, for restraining movement of an occupant 12 relative to the vehicle.

A system of the invention is usable with any one of many different types of vehicles. For example, the system could be used in an aircraft, such as a helicopter, to restrain a side gunner; or in an armored land vehicle to restrain a turret gunner. The system can be used in a driver or passenger seated position, as well.

The vehicle includes a portion relative to which the movement of the occupant 12 is to be restrained. The particular vehicle portion 80 that is illustrated (FIGS. 1 and 2) is a floor portion or floor panel of the vehicle, and the system 10 can selectively restrain movement of the occupant away from the floor panel. In one specific embodiment, the system 10 is used to secure a turret gunner in an armored land vehicle, allowing the gunner to be seated in a sling seat 82 (FIG. 1) or to stand while firing a weapon, but preventing the gunner from being ejected from the vehicle should the vehicle suffer an accident or overturn.

Some components of the occupant protection system 10 are fixed to the vehicle. In the illustrated embodiment, a retractor shown schematically at 84 is fixed to the vehicle portion 80. The retractor 84 is any suitable occupant restraint system retractor that can lock in response to sensing of an accident condition or a rollover condition of the vehicle.

A retractable element 86 extends from the retractor. The retractable element 86 may be a cable or a length of belt webbing, for example. The retractable element 86 is adapted to engage the restraint 50 that is incorporated into the vest 20. In the illustrated embodiment, the retractable element 86 has two end portions 88 and 90 that are adapted to releasably engage the restraint 50 that is incorporated into the vest 20. The end portions 88 and 90 may be, for example, buckles adapted to lockingly receive latches 52 and 54 of the restraint 50, in a manner as described below.

Optionally located in the line of force transmission between the end portions and the retractor is an emergency release mechanism shown schematically at 92 that may be, for example, a single point snap hook. The mechanism 92 is operable to disconnect the retractable element 86 from the retractor 84, in one quick operation, to facilitate emergency release of the occupant 12 from the vehicle.

Figure 4:
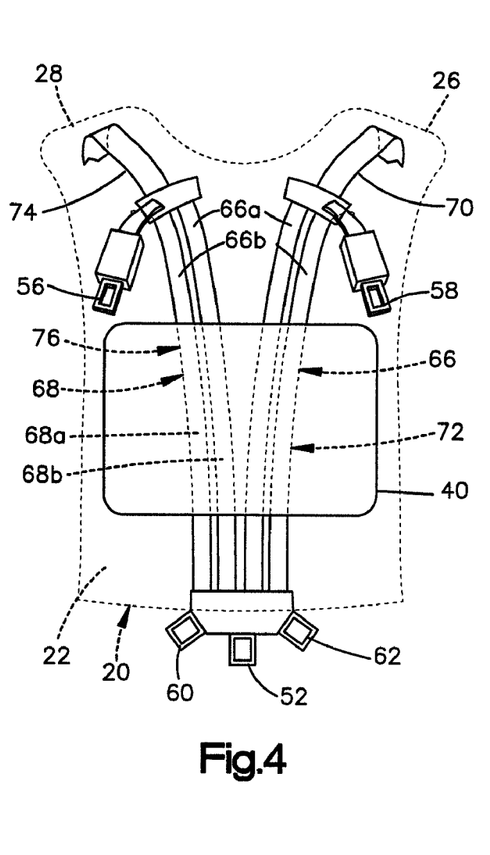
FIG. 4 is a front view of the vest and restraint of FIG. 1.

The vest 20 and restraint 50 may also be used to secure the occupant 12 in position in other types of seats with other buckles. Thus, the vest 20 includes shoulder latches 56 and 58 (FIG. 2) for connection with shoulder buckles (not shown) elsewhere in a vehicle, and pelvic latches 60 and 62 (FIG. 4) for connection with pelvic buckles (not shown) elsewhere in a vehicle. Because the vest 20 includes a number of different latches, one vest may be provided which can be used by any occupant no matter where the occupant is seated.

Figure 3:
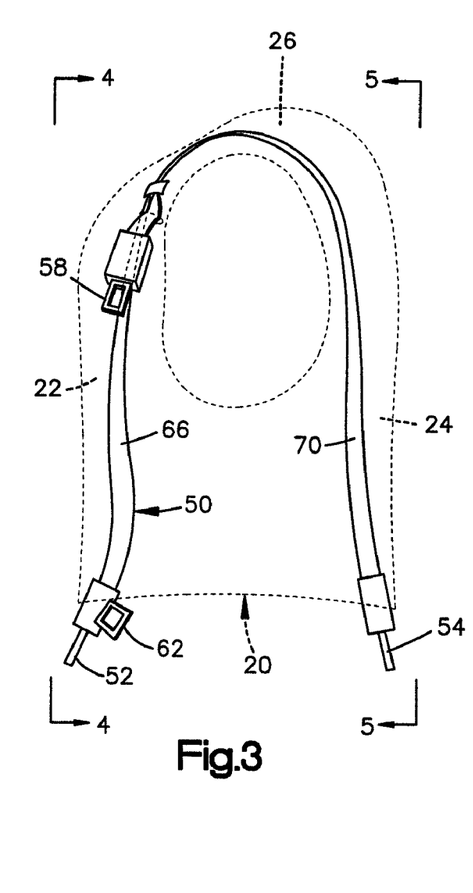
FIG. 3 is a side view of the vest and restraint of FIG. 1.
Figure 5:
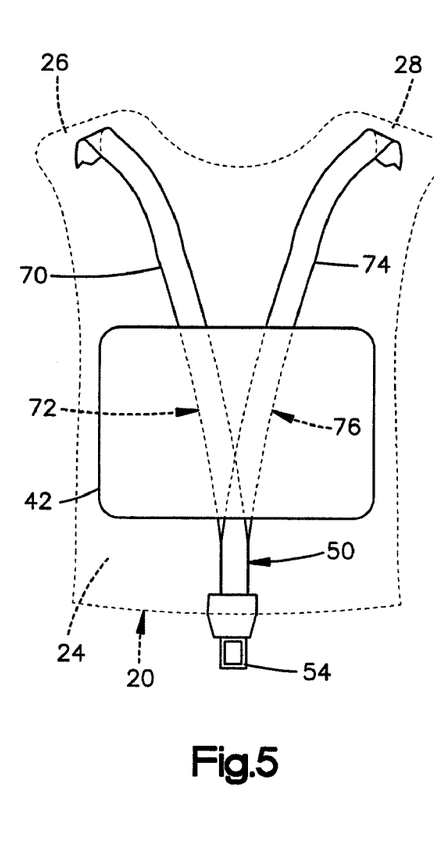
FIG. 5 is a back view of the vest and restraint of FIG. 1.

The vest 20 (FIGS. 3-5) includes a front panel 22, a back panel 24, and left and right shoulder portions 26 and 28 extending between the front panel and the back panel. (The term "vest" is used herein to include any type of upper garment or torso-encircling garment that is suitable for incorporating a restraint.) The vest 20 may be similar to a typical military "carrier" vest that is adapted to carry body armor for helping to protect the occupant of the vest. To that end, the front panel 22 and the back panel 24 of the vest 20 are preferably made up of several layers of material, with spaces between them to permit placement of a body armor panels.

Figure 7:
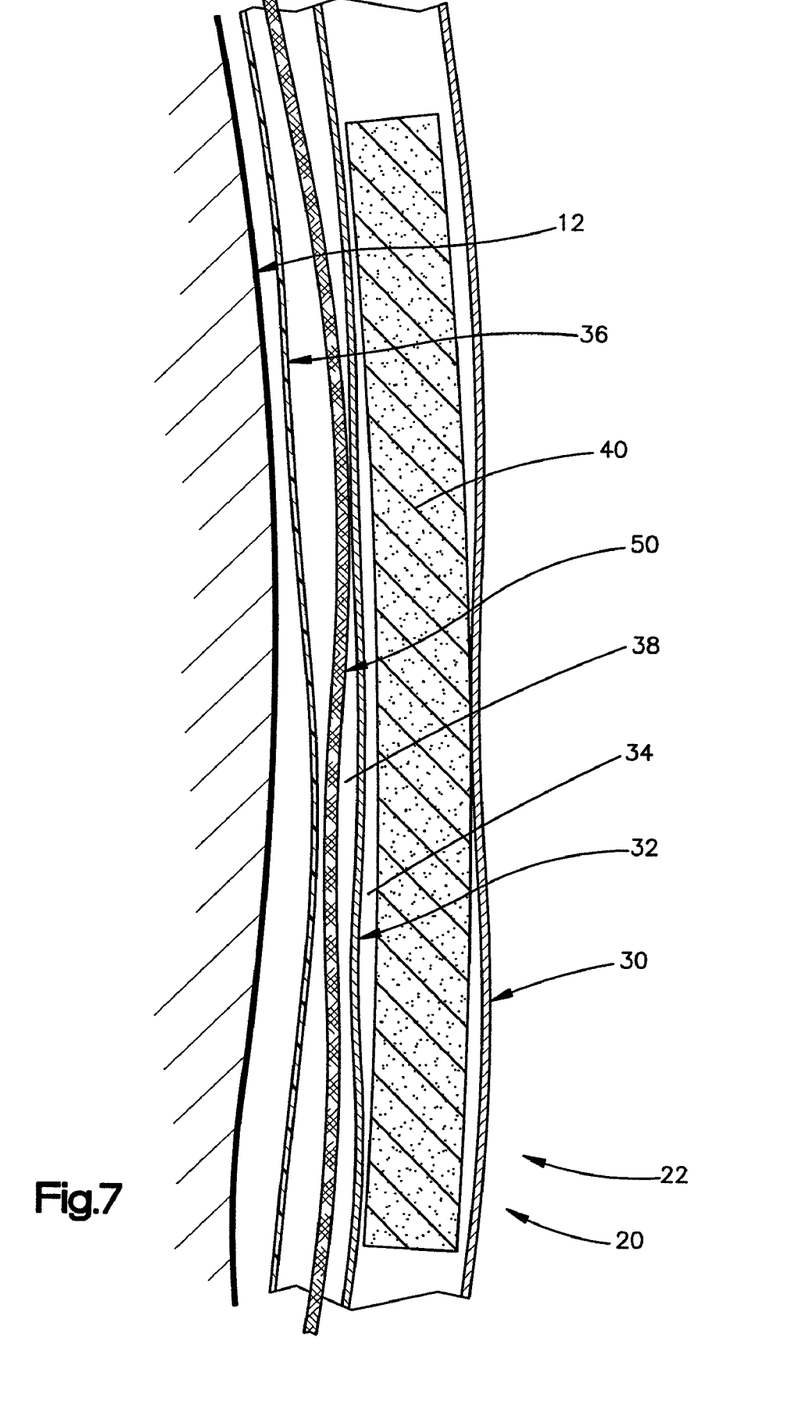
FIG. 7 is an enlarged schematic sectional view of a portion of the vest and restraint illustrating the positioning of the restraint within the vest.

This type of construction is shown schematically in FIG. 7, illustrating a portion of the vest front panel 22 (the vest back panel 24 is similar). In the particular embodiment illustrated, the panel 22 includes outer and inner material layers 30 and 32 (typically fabric) that define between them a hard armor pocket 34. The panel 22 also includes a mesh fabric layer 36 that is adjacent to and overlies the inner fabric layer 32. The mesh layer 36 is innermost on the vest panel 22, closest to the occupant's body. The outer layer 30 may form the outer face of the vest 20. The mesh layer 36 may form the inner face of the vest 20.

A webbing pocket 38 is defined between the mesh fabric layer 36 and the inner fabric layer 32. The webbing pocket 38 is separate and distinct from the hard armor pocket 34. Each one of the vest back panel and the vest shoulder portions 26 and 28 of the vest 20 similarly has a webbing pocket between layers through which belt webbing can extend. The webbing pockets are all located inside of the hard armor pockets, closer to the occupant's body when the vest is being worn.

A hard body armor panel shown schematically at 40 (FIG. 4) is located in the hard armor pocket 34 of the vest front panel 22. Another hard body armor panel 42 (FIG. 5) is located in a hard armor pocket in the vest back panel 24.

The restraint 50, which is incorporated into the vest 20, includes a plurality of latches that are accessible on the outside (exterior) of the vest 20 for connection with other portions of the occupant protection system 10, such as buckles. The plurality of latches includes a front latch 52 and a back latch 54. The front latch 52 is secured in position on the vest 20, for example by sewing to one or more of the fabric portions of the front panel 22 of the vest. The back latch 54 is secured in position on the vest 20, for example by sewing to one or more of the fabric portions of the back panel 24 of the vest.

The plurality of latches also includes, in this embodiment, a right shoulder latch 56 and a left shoulder latch 58. The shoulder latches 56 and 58 may be secured in position on the vest 20, for example by sewing to one or more of the fabric portions of the front panel 22 or the shoulder portions of the vest. The plurality of latches also includes, in this embodiment, a right pelvic latch 60 and a left pelvic latch 62. In the illustrated embodiment, the pelvic latches 60 and 62 are located adjacent to, and are fixed for movement with, the front latch 52.

The restraint 50 includes a plurality of webbing sections that extend in a force-transmitting manner between the various latches of the restraint. The webbing sections are all preferably located in the webbing pockets of the vest 20. A first webbing section 66 (FIGS. 3 and 4) extends between the front latch 52 and the left shoulder latch 58. In the illustrated embodiment, the first webbing section 66 includes two lengths of belt webbing 66a and 66b that extend in parallel between the front latch 52 and the left shoulder latch 58. The first webbing section 66 may alternatively include more than two lengths, or only one length of belt webbing extending between the front latch 52 and the left shoulder latch 58. The first webbing section 66 is operative to transmit force between the front latch 52 and the left shoulder latch 58.

A second webbing section 68 extends between the front latch 52 and the right shoulder latch 58. In the illustrated embodiment, the second webbing section 68 includes two lengths of belt webbing 68a and 68b that extend in parallel between the front latch 52 and the right shoulder latch 58. The second webbing section 68 may alternatively include more than two lengths, or only one length of belt webbing extending between the front latch 52 and the right shoulder latch 58. The second webbing section 68 is operative to transmit force between the front latch 52 and the right shoulder front latch 58.

A third webbing section 70 extends between the left shoulder latch 58 and the back latch 54. In the illustrated embodiment, the third webbing section 70 includes one length of belt webbing that extends from the left shoulder latch 58, through the left shoulder portion 26 and the back panel 24, to the back latch 54. The third webbing section 70 may alternatively include more than one length of belt webbing extending between the left shoulder latch 58 and the back latch 54. The third webbing section 70 is connected, at the location of the left shoulder latch 58, with the first webbing section 66. The third webbing section 70 is operative to transmit force between the left shoulder latch 58 and the back latch 54. The first webbing section 66 and the third webbing section 70, together, form a loop of webbing 72 between the front latch 52 and the back latch 54, for transmitting force between the front latch and the back latch.

A fourth webbing section 74 extends between the right shoulder latch 56 and the back latch 54. In the illustrated embodiment, the fourth webbing section 74 includes one length of belt webbing that extends from the right shoulder latch 56, through the right shoulder portion 28 and the back panel 24, to the back latch 54. The fourth webbing section 74 may alternatively include more than one length of belt webbing extending between the right shoulder latch 56 and the back latch 54.

The fourth webbing section 74 is connected, at the location of the right shoulder latch 56, with the second webbing section 68. The fourth webbing section 74 is operative to transmit force between the right shoulder latch 56 and the back latch 54. The second webbing section 68 and the fourth webbing section 74, together, form a loop 76 of webbing between the front latch 52 and the back latch 54, for transmitting force between the front latch and the back latch. (In an alternative embodiment, not shown, the webbing loops between the front and back latches 52 and 54 need not be associated with shoulder latches.)

The first, second, third and fourth webbing sections 66, 68, 70 and 74 extend within (between) two of the multiple material layers of the vest 20. Specifically, the first, second, third and fourth webbing sections 66, 68, 70 and 74 extend through the webbing pockets 38 in the vest 20. Thus, in the illustrated embodiment, the webbing sections 66, 68, 70 and 74 are separated from the occupant (inside the vest) by only the mesh fabric layer 36. Optionally, the webbing may be separated from the occupant by other "soft" material such as additional layers of vest fabric, or soft body armor.

Figure 8:
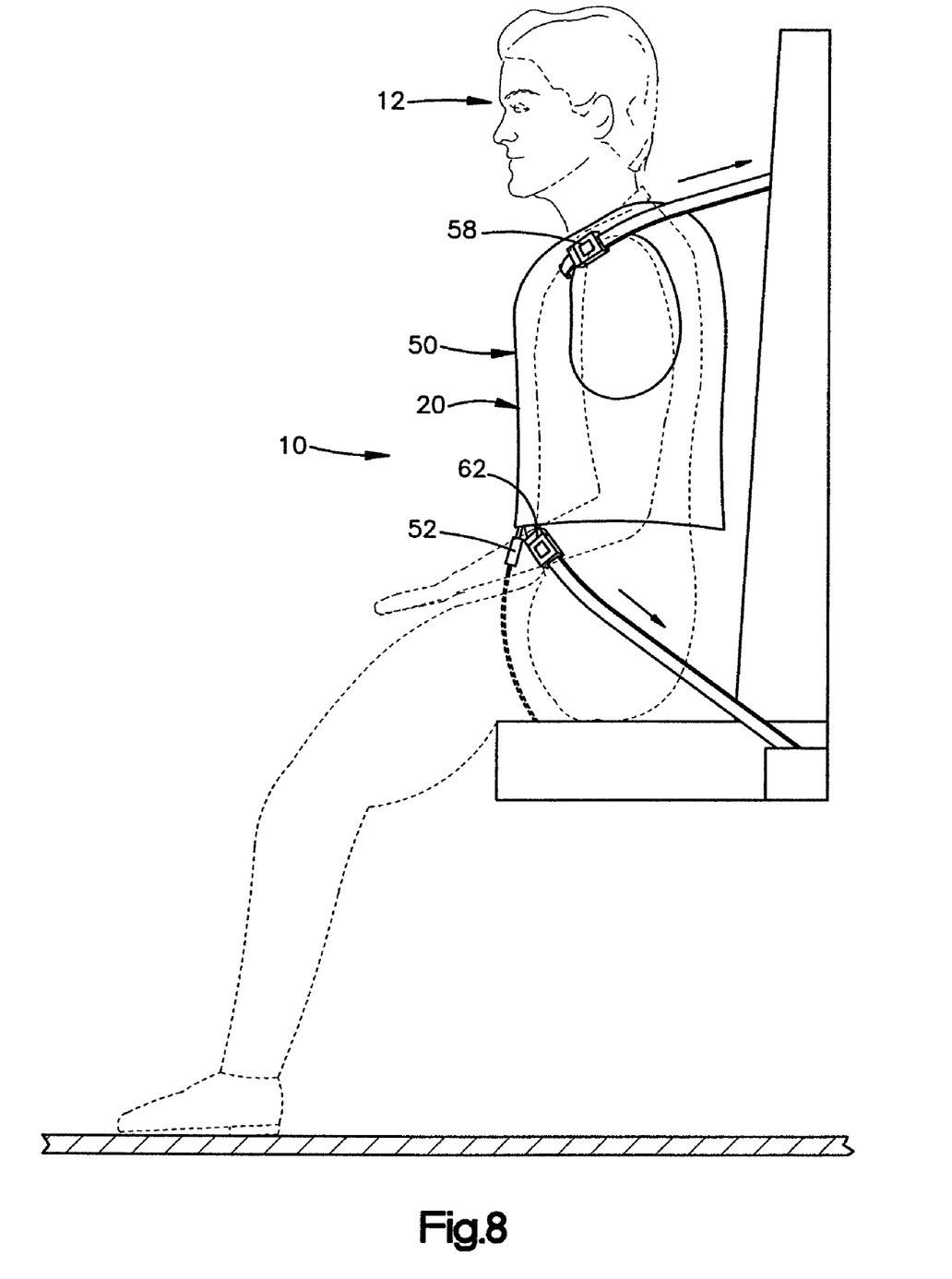
FIG. 8 is a schematic side view illustrating use of the vest and restraint in a driver or passenger seat.

After the occupant dons the vest 20, the restraint 50 may be connected with the vehicle to help restrain movement of the occupant relative to the vehicle. The occupant protection system adjacent to the occupant's seat may include either pelvic buckles or shoulder buckles, in which case the occupant can releasably connect (as illustrated schematically in FIG. 8) any or all of the shoulder latches 56 and 58 and the pelvic latches 62 and 64, thereby to secure the occupant in the seat. The front latch 52 may also be used, to provide a five-point connection.

Figure 2:
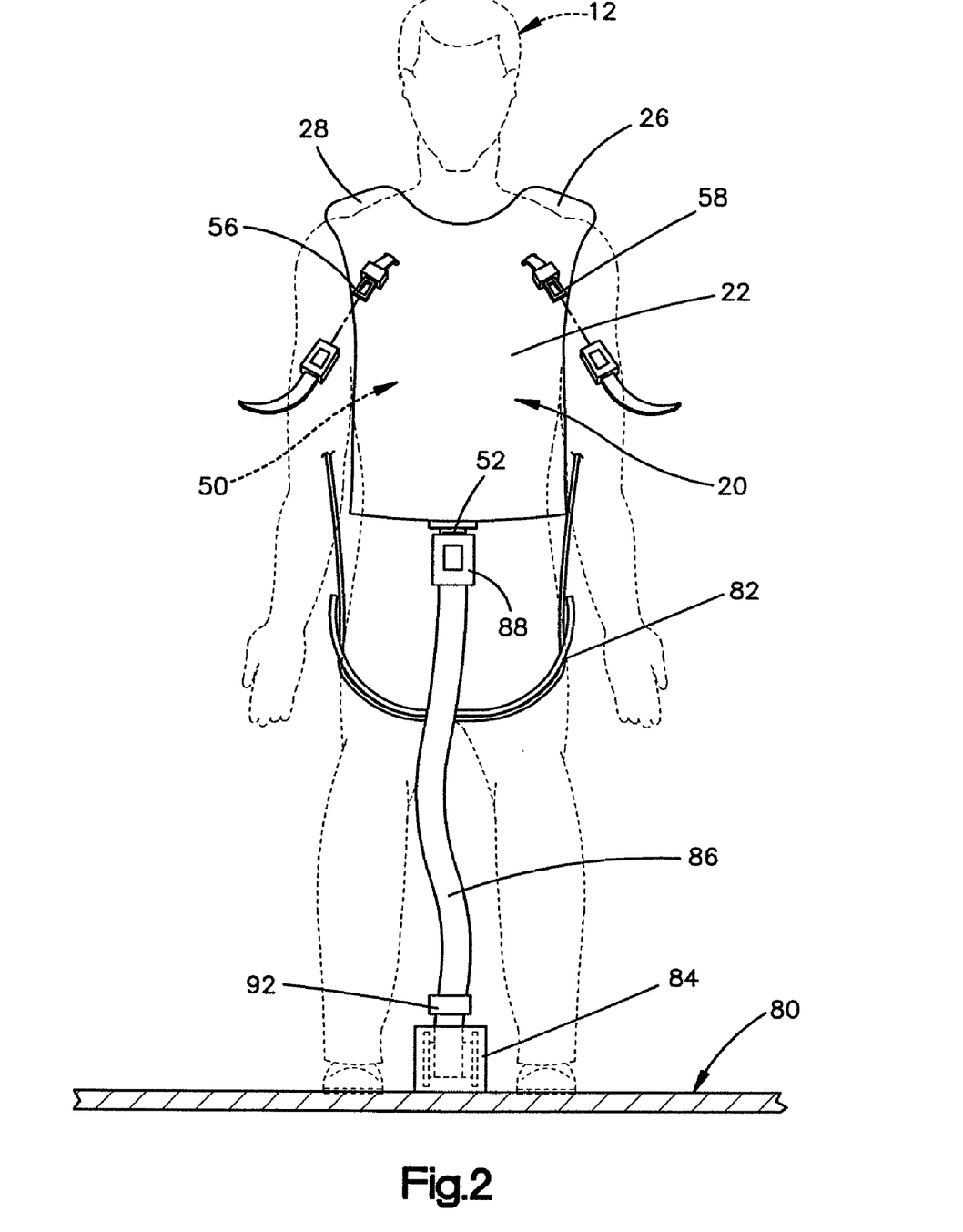
FIG. 2 is a front view of the seat, vest and restraint of FIG. 1.
Figure 6:
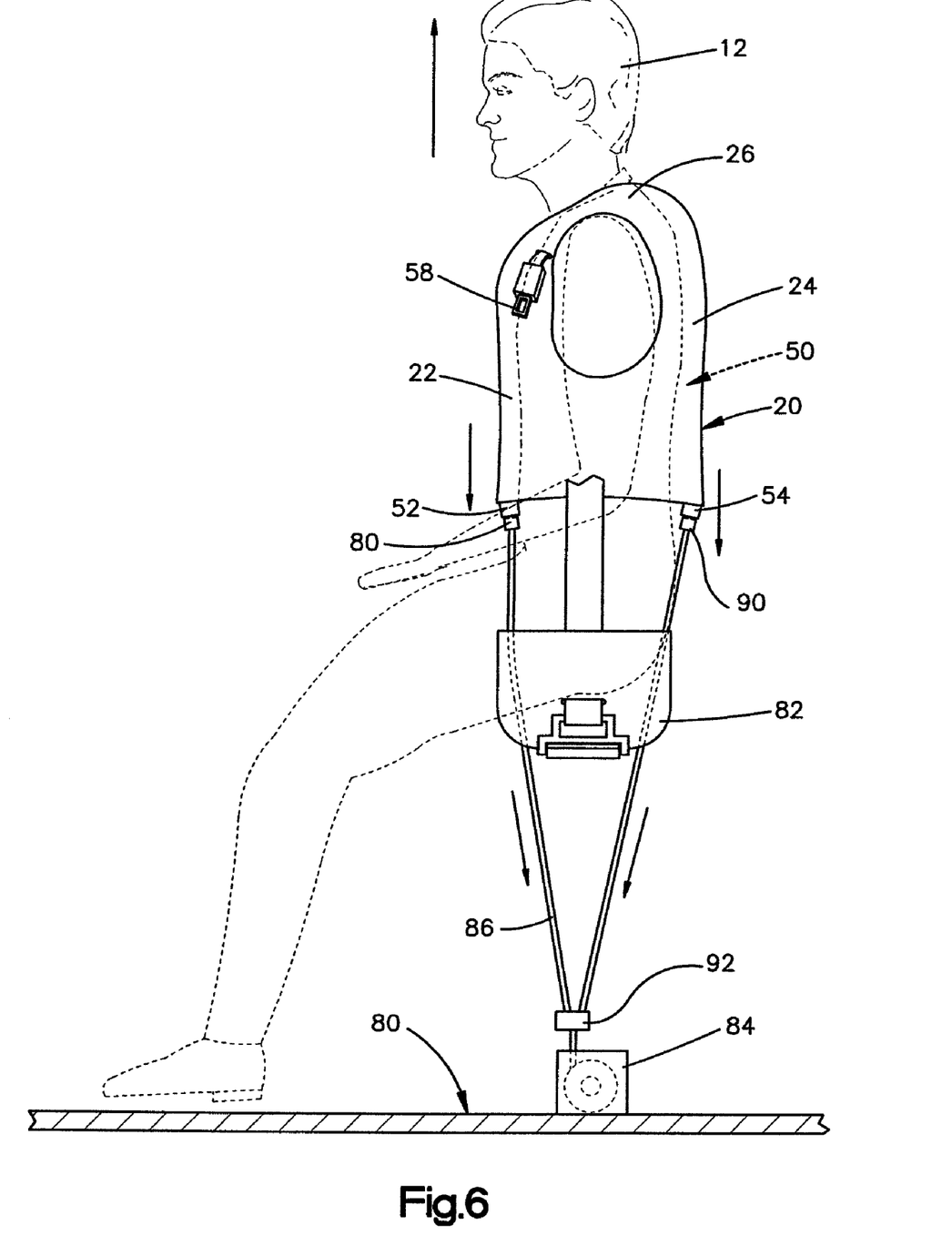
FIG. 6 is a view similar to FIG. 1 showing the vest and restraint in a condition restraining the occupant from movement relative to a vehicle floor.

On the other hand, if the occupant 12 is seated in, for example, a sling seat 82 in a gun turret, as shown schematically in FIGS. 1, 2 and 6, the occupant can releasably connect the front and back latches 52 and 54 with the vehicle. In this case, the occupant 12 connects the front latch 52 and the back latch 54 with the end portions 88 and 90, respectively, of the retractable element 86 that extends from the floor-mounted retractor 84. Once this releasable connection is made, the occupant 12 can still move around in the vehicle, away from the retractor 84, because additional length of the retractable element 86 can be withdrawn from the retractor 84. When the occupant 12 thereafter moves back toward the retractor 84, the retractable element 86 is retracted into the retractor.

A vehicle accident condition or a vehicle rollover condition may cause the occupant 12 to move rapidly away from the vehicle floor portion 80 including the retractor 84. For example, the vehicle condition may tend to urge the occupant 12 to move in a direction so as to be ejected from the vehicle. The restraint system 10 prevents such an occurrence. (The following description assumes that the occupant 12 is connected by only the front and back latches 52 and 54. The occupant would also be restrained were if the occupant were connected to the vehicle portion by other latches.)

Specifically, in the event of a vehicle accident condition or a vehicle rollover condition, the retractor 84 locks, blocking withdrawal of the retractable element 86 from the retractor. As a result, the front and back buckles 88 and 90, and the engaged front and back latches 52 and 54, are prevented from moving away from the vehicle floor portion 80. Because the front and back latches 52 and 54 are fixed to the two webbing portion loops 72 and 76, the webbing loops, which extend between the front and back latches, are able to restrain the torso of the occupant 12.

The occupant's shoulders engage the shoulder portions 26 and 28 of the vest 20. The force of the occupant's movement is transmitted into the webbing loops 72 and 76 that extend through the shoulder portions 26 and 28 of the vest 20. The webbing loops 72 and 76 restrain movement of the occupant 12 away from the vehicle floor portion 80, as desired.

The positioning of the four webbing sections 66, 68, 70 and 74 on the interior of the vest 20 and thereby close to or against the occupant's body (separated only by the mesh layer 36, for example), when the vest 20 is worn, improves restraint performance and ease of use for the occupant 12. The placement of the restraint 50 inside of any hard armor also enhances both comfort and performance of the restraint, and helps to protect the hard armor. The internal placement of the restraint 50 also helps to avoid entanglement with or pressing on any equipment that the occupant 12 may be carrying in or on the vest 50. As a result, the restraining force is not transmitted into or through any exterior parts of the vest 20, or through any accessories on the vest. As noted above, the webbing may optionally be separated from the occupant by other "soft" material such as additional layers of vest fabric, or soft body armor.

The occupant 12 can be released from the system 10 either by actuating the dual buckles 88 and 90 that connect with the front and back latches 52 and 54 or, in case of emergency, by releasing the single point snap hook 92 thus releasing the occupant from the retractor 84.

The invention claimed is:

1. Apparatus for helping to protect an occupant of a vehicle, comprising:
    a vest; and
    a restraint incorporated into the vest;
    the vest including a front panel, a back panel, and left and right shoulder portions extending between the front panel and the back panel, the vest having an inner face and an outer face;
    the restraint including a front latch fixed to the vest front panel and a back latch fixed to the vest back panel;
    the restraint including webbing portions extending in a force-transmitting relationship between the front latch and the back latch, within the front panel and the shoulder portions and the back panel of the vest, so as to extend at least partially around the torso of a occupant when wearing the vest;
    the front panel of the vest including a front hard armor pocket and the back panel of the vest including a back hard armor pocket, for receiving and supporting panels of hard body armor.

2. Apparatus as set forth in claim 1 further including body armor panels in the front and back hard armor pockets of the vest.

3. Apparatus as set forth in claim 1 wherein each one of the vest front panel and the vest back panel includes a webbing pocket through which the webbing portions of the restraint extend, the webbing pockets being separate from the armor pockets and located closer to the inner face of the vest than the hard armor pockets.

4. Apparatus as set forth in claim 3 wherein the vest includes a single material layer between the webbing pockets and the inner face of the vest.

5. Apparatus as set forth in claim 1 wherein the restraint webbing portions include:
    a first webbing loop extending from the front latch through the left shoulder portion and to the back latch for transmitting force between the front latch and the back latch; and
    a second webbing loop extending from the front latch through the right shoulder portion and to the back latch for transmitting force between the front latch and the back latch.

6. Apparatus as set forth in claim 5 wherein each one of the vest front panel and the vest back panel includes a webbing pocket through which the webbing loops extend, the webbing pockets being separate from the armor pockets and located closer to the inner face of the vest than the armor pockets.

7. Apparatus as set forth in claim 1 wherein the vest further includes two pelvic latches and two shoulder latches.

8. A restraint system for helping to protect an occupant of a vehicle by restraining movement of the occupant relative to a vehicle portion, the system including a vest and a restraint incorporated into the vest;
    the vest including a front panel, a back panel, and left and right shoulder portions extending between the front panel and the back panel;
    the restraint including a front latch fixed to a lower portion of the vest front panel and a back latch fixed to a lower portion of the vest back panel;
    the restraint including a left shoulder latch fixed to a left shoulder portion of the vest panel, and a right shoulder latch fixed to a right shoulder portion of the vest panel;
    the restraint including a first webbing portion extending between the front latch and the left shoulder latch, and a second webbing portion extending between the left shoulder latch and the back latch;
    the restraint including a third webbing portion extending between the front latch and the right shoulder latch, and a fourth webbing portion extending between the right shoulder latch and the back latch;
    the front latch having a portion that is releasably connectable in a force-transmitting manner with the vehicle portion, and the back latch having a portion that is releasably connectable in a force-transmitting manner with the vehicle portion, whereby the restraint and thus the vest are securable to the vehicle portion.

9. A system as set forth in claim 8 wherein the vest has multiple material layers, and the first and second and third and fourth webbing portions are disposed within the multiple material layers of the vest and not on the exterior of the vest.

10. A system as set forth in claim 9 wherein the multiple material layers of the vest define front and back hard armor pockets for receiving front and back panels of hard body armor to be carried in the vest; and
    the webbing portions are disposed within the multiple material layers of the vest, do not extend within the hard armor pockets, and are not on the exterior of the vest.

11. A system as set forth in claim 8 further including a front buckle adapted to be fixed to the vehicle portion for connection with the front latch, and a back buckle adapted to be fixed to the vehicle portion for connection with the back latch.

12. A system as set forth in claim 11 further including a retractor interposed between the vehicle portion and the front and back latches, the retractor adapted to be having an unlocked condition in which belt webbing can be withdrawn from the retractor to enable the front and back latches and the vehicle occupant to move away from the vehicle portion, the retractor moving from the unlocked condition to a locked condition in response to a sensed vehicle condition to block withdrawal of belt webbing from the retractor thereby to restrain movement of the front and back latches and the vehicle occupant away from the vehicle portion.

13. A system as set forth in claim 12 wherein the vehicle portion is a floor portion of the vehicle.

* * * * *